(12) United States Patent
Singleton et al.

(10) Patent No.: US 7,836,957 B2
(45) Date of Patent: Nov. 23, 2010

(54) IN SITU CONVERSION OF SUBSURFACE HYDROCARBON DEPOSITS TO SYNTHESIS GAS

(76) Inventors: Alan H. Singleton, 1265 Woodland Rd., Baden, PA (US) 15005-2533; Richard A. Flinn, 212 Kensington Ct., Pittsburgh, PA (US) 15238-1516

( * ) Notice: Subject to any disclaimer, the term of this patent is extended or adjusted under 35 U.S.C. 154(b) by 50 days.

(21) Appl. No.: 12/229,052

(22) Filed: Aug. 20, 2008

(65) Prior Publication Data

US 2009/0065211 A1    Mar. 12, 2009

Related U.S. Application Data

(60) Provisional application No. 60/993,306, filed on Sep. 11, 2007.

(51) Int. Cl.
*E21B 43/24* (2006.01)
(52) U.S. Cl. ...................... 166/369; 166/302
(58) Field of Classification Search ............... 166/369, 166/302, 303
See application file for complete search history.

(56) References Cited

U.S. PATENT DOCUMENTS

| | | | | |
|---|---|---|---|---|
| 3,620,700 | A | * 11/1971 | Schlinger et al. | ............... 48/215 |
| 2008/0236817 | A1 | * 10/2008 | Tillman | ................... 166/251.1 |
| 2008/0283241 | A1 | * 11/2008 | Kaminsky et al. | ........... 166/245 |
| 2009/0014180 | A1 | * 1/2009 | Stegemeier et al. | ......... 166/302 |

* cited by examiner

*Primary Examiner*—William P Neuder
(74) *Attorney, Agent, or Firm*—The Webb Law Firm

(57) ABSTRACT

A method for producing synthesis gas from underground hydrocarbon deposits is described. Oxygen and water are reacted with the hydrocarbon deposit under conditions conducive to the production of carbon monoxide and hydrogen. The method is applicable to oil reservoirs from which conventional production means are unable to recover additional oil practically, to viscous oil deposits from which production is limited, and to shale oil deposits.

16 Claims, No Drawings

IN SITU CONVERSION OF SUBSURFACE HYDROCARBON DEPOSITS TO SYNTHESIS GAS

BACKGROUND OF THE INVENTION

Much of the oil in most reservoirs remains in place after all present-day methods of production have been applied to recovery. The U.S. Department of Energy estimates currently that 70% to 80% of the oil that has been discovered in the United States remains underground. This is true in much of the world, and in the case of viscous, or "heavy", oil deposits the amount left in the ground after all known methods of enhanced production have been applied exceeds 90%. With oil shale there is very little hydrocarbon production because of the small amount of hydrocarbon associated or bonded with a large amount of inorganic material (rock or shale).

Many enhanced recovery means have been developed and applied to oil reservoirs, including a method called "fire flooding", whereby combustion is initiated in the oil reservoir and is sustained by injecting air. The heat from combustion lowers the viscosity of the oil deposit, the combustion product gases generate pressure, and the result is the "driving" of oil from the injection well in which the combustion is initiated toward a production well a distance away.

Fire flooding is operated so as to produce the maximum amount of oil and to minimize the amount of oil converted to combustion gases. The carbon dioxide and attendant nitrogen from the injected air sustaining combustion are major diluents in the gas produced. The objective of "fire flooding" is to produce the maximum amount of oil recoverable by this method and the gas made is not a useful product.

In the case of oil shale, no commercially successful method of production has been as yet developed for the vast U.S. and other deposits of oil shale.

BRIEF SUMMARY OF THE INVENTION

We have found that underground hydrocarbon deposits are best converted to useful products when controlled oxidation is carried out under conditions whereby gases are the major useful products and these gases are largely carbon monoxide and hydrogen, which are useful themselves as fuels or as "synthesis gas" which can be converted to liquid fuels and chemicals in surface-operated process facilities.

The heat and pressure attendant to this synthesis-gas-directed underground oxidation may produce a modest amount of oil as occurs in "fire flooding", and this oil production is not undesirable, but the production of the reactive gases carbon monoxide and hydrogen is maximized in our process by using Oxygen and by selecting appropriate reaction conditions, thereby controlling the oxidation to achieve only partial conversion of the hydrocarbons present.

DETAILED DESCRIPTION OF THE INVENTION

The conditions under which the underground conversion of oil and shale to synthesis gas are carried out are critical:

- oxidation must be initiated and sustained by Oxygen, not air, to minimize the amount of diluent nitrogen and other inert gases in the product gases (Oxygen is defined as air from which some or all of the nitrogen and argon have been rejected, such that the oxygen content may be in the range of 50 to 100 percent oxygen, and is hereinafter differentiated from pure oxygen by the capitalization of the first letter of Oxygen);
- reaction temperature must be controlled to promote carbon monoxide production, not carbon dioxide, and hydrogen, not water; in other words, partial Oxidation at temperatures more moderate than those of combustion is the objective;
- reaction temperature must also be maintained at a level below the temperature at which the subsurface inorganic materials in which the oil is dispersed remain stable as solids, neither decomposing nor fusing to damage the reservoir structure;
- the specific reaction temperature desired for any given oil reservoir as determined by the preceding criteria is to be maintained by control of the amount of water, or steam, injected with the Oxygen, recognizing that some or all of the required water may be present in the reservoir with the oil;
- pressure must be kept to a value slightly less than the hydrostatic water pressure as determined by the subsurface depth level of the partial oxidation process being carried out to maintain the integrity of the subsurface reaction zone, avoiding surface breakthrough; hydrocarbon deposits with an overlying water table are advantageous for gas containment;
- the initiation of the oxidation reaction and the injection point of the reactant Oxygen and water must be near the top of an oil reservoir to establish a connection with the production well as rapidly as practical to begin the production of synthesis gas early in the process; subsequent to breakthrough and the start of synthesis gas production, the injection point is to be lowered steadily into the reservoir as the resident oil is converted to maximize the amount of oil reacted over the life of the "well-pair" (injection and production wells).
- in the case of oil shale deposits, the deposit may be naturally fractured or may be fractured by hydrostatic or mechanical means prior to initiation of partial oxidation processes; the initiation point for the combustion process in oil shale is to be at the bottom of the fractured zone to enable the rising reaction heat to release the shale oil above the reaction zone into the lower reaction zone and the flow of product gases through the fractured structure to the production well.

We claim:

1. A method for the production of synthesis gas from oil or shale oil situated in an underground reservoir, comprising the steps of:
   - injecting an oxidant into the underground reservoir through an injection well, wherein the reservoir contains at least one hydrocarbon source selected from the group consisting of oil and shale oil;
   - initiating a partial oxidation reaction of the hydrocarbon source;
   - sustaining the partial oxidation reaction to produce synthesis gas; and
   - recovering the synthesis gas from the reservoir through a production well,
   - wherein the synthesis gas comprises carbon monoxide and hydrogen.

2. The method for the production of synthesis gas from oil or shale oil situated in an underground reservoir of claim 1, wherein the temperature and/or pressure conditions within the reservoir are controlled so as to promote production of synthesis gas.

3. The method for the production of synthesis gas from oil or shale oil situated in an underground reservoir of claim 2, wherein the temperature and/or pressure conditions within the reservoir are controlled by adjusting the amount of oxidant injected into the well.

4. The method for the production of synthesis gas from oil or shale oil situated in an underground reservoir of claim 1, wherein the oxidant comprises oxygen.

5. The method for the production of synthesis gas from oil or shale oil situated in an underground reservoir of claim 1, wherein the temperature within the reservoir is kept below the temperature at which a subsurface material of the reservoir structure decomposes or fuses while sustaining the partial oxidation reaction.

6. The method for the production of synthesis gas from oil or shale oil situated in an underground reservoir of claim 1, wherein the underground reservoir comprises oil.

7. The method for the production of synthesis gas from oil or shale oil situated in an underground reservoir of claim 6, wherein the initiation of the partial oxidation reaction occurs near the top of the oil in the reservoir.

8. The method for the production of synthesis gas from oil or shale oil situated in an underground reservoir of claim 7, wherein an injection point of the oxidant is lowered into the reservoir as the oil is reacted.

9. The method for the production of synthesis gas from oil or shale oil situated in an underground reservoir of claim 1, wherein the underground reservoir comprises shale oil contained in oil shale.

10. The method for the production of synthesis gas from oil or shale oil situated in an underground reservoir of claim 9, wherein the method further includes the step of fracturing the oil shale prior to initiating the partial oxidation reaction.

11. The method for the production of synthesis gas from oil or shale oil situated in an underground reservoir of claim 10, wherein the oil shale is hydrostatically or mechanically fractured.

12. The method for the production of synthesis gas from oil or shale oil situated in an underground reservoir of claim 10, wherein the initiation of the partial oxidation reaction occurs near the bottom of a fracture zone in the oil shale.

13. The method for the production of synthesis gas from oil or shale oil situated in an underground reservoir of claim 4, wherein the oxidant comprises from 50 to 100 percent oxygen.

14. The method for the production of synthesis gas from oil or shale oil situated in an underground reservoir of claim 4, wherein the oxidant further comprises liquid water or steam.

15. The method for the production of synthesis gas from oil or shale oil situated in an underground reservoir of claim 14, wherein the temperature conditions within the reservoir are controlled by adjusting the amount of liquid water or steam injected into the reservoir.

16. The method for the production of synthesis gas from oil or shale oil situated in an underground reservoir of claim 1, wherein the partial oxidation reaction conditions are controlled to maximize the production of CO and $H_2$.

* * * * *